US 6,453,741 B1

(12) United States Patent
Beck, II

(10) Patent No.: US 6,453,741 B1
(45) Date of Patent: Sep. 24, 2002

(54) FUEL TRANSMITTER FOR NON-ELECTRICALLY INVASIVE LIQUID LEVEL MEASUREMENT

(75) Inventor: Charles W. Beck, II, Burleson, TX (US)

(73) Assignee: International Avionics, Inc., Addison, TX (US)

( * ) Notice: Subject to any disclaimer, the term of this patent is extended or adjusted under 35 U.S.C. 154(b) by 29 days.

(21) Appl. No.: 09/645,761

(22) Filed: Aug. 25, 2000

Related U.S. Application Data

(60) Provisional application No. 60/150,776, filed on Aug. 26, 1999.

(51) Int. Cl.$^7$ .................... G01F 23/36; G01F 23/30; G08B 21/00
(52) U.S. Cl. ............... 73/313; 73/305; 73/308; 340/623
(58) Field of Search .................. 73/305, 307, 308, 73/313, 322.5; 137/409; 340/623

(56) References Cited

U.S. PATENT DOCUMENTS

| 3,954,009 A | * | 5/1976 | Lederer | ...................... 73/198 |
| 4,646,085 A | * | 2/1987 | Mathis | .................. 340/870.19 |
| 4,986,124 A | * | 1/1991 | Byrne et al. | .................. 73/313 |

* cited by examiner

*Primary Examiner*—Hezron Williams
*Assistant Examiner*—Katina Wilson
(74) *Attorney, Agent, or Firm*—Goodwin Gruber, P.C.; Arthur I. Navarro

(57) ABSTRACT

A fuel level transmitter (10) consisting of two magnetic rotors (14, 16) placed on opposite sides of a non-ferrous wall (26) are arranged so that when the first rotor (14) is turned, the second rotor (16) follows due to the magnetic coupling between the two rotors (14, 16). Torque is produced, in part, as a function of the offset of the poles, magnetic strength and the distance between the rotors (14, 16).

21 Claims, 7 Drawing Sheets

FUEL TRANSMITTER FOR NON-ELECTRICALLY INVASIVE LIQUID LEVEL MEASUREMENT

CROSS-REFERENCE TO RELATED APPLICATION

The application is related to Provisional Application Ser. No. 60/150,776 entitled "FUEL TRANSMITTER FOR NON-ELECTRICALLY INVASIVE LIQUID LEVEL MEASUREMENT," by Charles W. Beck, filed Aug. 26, 1999, the entirety of which is incorporated herein by reference. This application claims priority on the aforementioned related provisional application.

TECHNICAL FIELD

The present invention relates generally to a liquid level indicator such as a fuel level indicator used in airplanes, boats and automobiles, and more particularly to a liquid level transmitter with magnetically coupled rotors that does not introduce electrical energy into the fuel tank.

BACKGROUND OF THE INVENTION

Without limiting the scope of the invention, its background is described in connection to fuel tanks, more specifically aircraft fuel tanks.

Liquid level measurement in aircraft, automobiles, boats and other vehicles has historically been measured by either of two methods, float or capacitance probe. Each of the two methods in common use are discussed below. In each of these techniques the fuel tank and its contents are subject to electrical energy in the measuring technique. Recently there have been serious safety concerns due to unexplained aircraft losses which may have been caused by a spark from the electrical equipment inside the fuel tank. Also, systems are described that have been proposed but either have not been implemented, have been implemented with poor results or have been implemented on a test basis only.

Float indicators were used on early aircraft since the aircraft lacked an electrical system. The initial non-electrical float system was used on various aircraft, the most famous being the Piper J-3 "Cub," which used a cork with a wire imbedded in it that extended into the view of the pilot. The fuel tank in a Cub is directly in front of the windshield and the tank has a cap with a hole that allows the wire to move up and down. The wire has a bend near the top end so that the end of the wire cannot fall into the fuel tank. Additionally, the bent wire is more visible to the pilot than a straight wire. The float. and wire indicator operate on a simple principle: lots of wire showing, lots of gas; no wire showing, no gas.

With the advent of aircraft and cars with electrical systems the float is connected to the arm of a variable resistor whose electrical leads are brought through the wall of the tank. The fuel quantity gauge is connected to the resistor leads and to the vehicle's electrical system. Typically, when the float is on the bottom of the tank, the resistance sensed is low and when the float is high, the resistance sensed is high, on the order of 30 Ohms. This causes the needle on the fuel quantity gauge to deflect as the float height varies thus indicating the quantity of fuel in the tank. For odd shaped tanks, particularly a flat tank in a wing with dihedral, the resistance floats may be connected-in series to cover this longer sloped tank. Techniques exist to calibrate the readings on the gauge, which may be either digital, indicated by a discrete number, or analog, indicated by a needle position.

A resistance float device is used on most, if not all, automobiles, all piston engine aircraft, and some turbine aircraft. This system has been given very poor reviews over the years. If the resistance float is poorly designed and constructed, the gauge is poorly designed and constructed, the gauge poorly marked, the damping not suitable for aircraft use, or if the system is poorly installed and calibrated, the criticism is deserved. This system also introduces electrical energy into the fuel tank.

Capacitance probes are another method used to measure liquid level, especially in fuel tanks. This system uses two concentric tubes arranged in the form of a probe inserted into the top of the fuel tank. Since the dielectric constant of fuel is radically different from that of air, a measure of the height of the fuel level can be made by measuring the capacitance between the two tubes. This system is used on most turbine aircraft and is convenient to install on deep tanks.

The spacing between the tubes can be used to provide a linear output in an odd shaped tank. These systems are generally expensive since the interconnecting wiring must be coaxial cable and some sort of a processor must be used to sum and linearize the probe outputs. Since the dielectric constant and density of turbine fuel varies with temperature, and since the pilot of a turbine installation would like to know the mass of the fuel in the tank rather than the volume, the capacitance probe must have a compensator probe built in to compensate for the dielectric constant to provide an output representing mass, . . . i.e. pounds of fuel. This system also introduces electrical energy into the fuel tank.

In the early days of aviation, an air pressure technique was used to measure the quantity of fuel in a tank. Basically, this method consisted of an air pressure gauge and an air pump connected to an air outlet at the bottom of the fuel tank. When the pump pressurized the gauge and the plumbing connected to the air outlet, the reading on the air pressure gauge increased until the air pressure exceeded the head pressure of the fuel tank and air began to bleed from the air outlet stabilizing the pressure in the system. At this point the reading on the air pressure gauge is equal to the head pressure of the fuel and is indicative of the mass of fuel in the tank. The pressure pump had to be properly designed to avoid excessive flow and thus an erroneous reading.

There has been an attempt to bring this method into the modern age. Systems have been built that used a differential pressure transducer measuring the head pressure in excess of atmospheric pressure. This output is then compensated for acceleration of the fuel mass in a dynamic environment, that is, at a varying distance from the surface of the earth to produce a "stable" indication of the mass of fuel in the tank. This technique suffers from the problem of attempting to measure a small reading which is the difference between two relatively large numbers. In this situation the errors generally overwhelm the attempted measurement.

There has even been an attempt to measure potable water by weighing the container, subtracting the bare weight of the container, and correcting for acceleration. This is arguably a more accurate method since the weight of the contents is much smaller than the weight of the container, but the problem with this method is that the container must be isolated from the structure while it is on the "scales." This method works for potable water since the container is generally removed from the vehicle for filling, but is not a practical solution for fuel tanks. These techniques do not introduce electrical energy into the fuel tank.

There are a number of schemes based upon internal reflection of light in a polycarbonate rod in the tank. This optical method is most often used for low fuel and low oil measurements and is in wide use in the aviation market. Another common application is the "magic eye" on certain automotive batteries to indicate the level of the electrolyte in the battery. These systems function as a "Yes/No" reading. When the liquid covers the end of the probe the magnitude of the reflected light is radically different than when the end of the probe is in air. In order to use this technique to measure a continuously changing liquid level, the sensor must either have "X" discrete sensors where "X" is the resolution desired or the probe must be designed to internally reflect a varying quantity of light with a varying level of liquid. The multi probe method is not practical in a moving aircraft, while the variable reflectivity method has calibration and long term stability problems. In general, these techniques do not introduce electrical energy into the fuel tank.

Magnetic methods of liquid level measurement utilizing a Hall Effect semiconductor device are discussed in the Honeywell Solid State Sensors Catalog. Determining the height of a float is one method of measuring the level of liquid in a tank. A linear output Hall Effect transducer in placed outside of the tank while a magnet is placed inside the non-ferrous metal tank, and moved by the motion of a float arm. As the liquid level moves up or down, the magnet moves relative to the transducer, causing a change in transducer output voltage. This system allows liquid level measurement without any electrical connections inside the tank. This method does, however, require some electronic interface to allow the output to be used with a gauge. Additionally, there are linearity and temperature effects that must be either compensated or suppressed. A set of transducers using this technique have been built and flown with promising results; however, the output must be linearized and additional work must be performed to insure temperature stability.

While the above referenced techniques are useful in measuring liquid level in some circumstances, they do not provide a reliable method of measuring liquid level without introducing electrical energy into the tank. What is needed is a device for measuring liquid level without introducing electrical energy into the tank. A device capable of reliably and inexpensively measuring liquid levels without introducing electrical energy into the tank would provide numerous advantages.

SUMMARY OF THE INVENTION

The present invention provides a fuel transmitter utilizing a magnetic drive with two magnetic rotors placed on either side of a non-ferrous plate which is used to cover an opening in either the side wall or top or bottom of the tank. Placement depends upon the specific application and configuration. The rotors, while on opposite sides of the plate, are arranged on axles each located on a common axis. Thus, when one rotor is turned, the other rotor follows the rotation due to the magnetic coupling between the two rotors. The torque available is a function of the offset of the poles (rotor diameter), magnetic strength (Gauss Level), and the distance between the rotors (Gap distance). Sufficient torque must be available to ensure close tracking of the following rotor and its readout device with the position of the driving rotor.

In one embodiment, a first rotor, the drive rotor, is attached to a float assembly. As the float assembly moves with changing liquid levels, the first rotor turns. The movement of the first rotor is followed by a second rotor, the output rotor. Although the first and second rotors are not physically connected, the rotors are bound together with a magnetic coupler. The magnetic coupler keeps the first and second rotors aligned and joined so that the second rotor will move the same angular displacement as the first rotor in response to the position of the float assembly. The second rotor turns a means for producing a liquid level quantity signal. For example, a variable resister may be used to produce a liquid level quantity signal.

In another embodiment, a system is disclosed for determining liquid levels in a tank. The system has a float connected by a float arm to a dual rotor liquid level transmitter. As the float moves within the tank, the liquid transmitter senses the change and transfers the movement to a gauge by a volume signal.

In another embodiment, the system further comprises a temperature probe and a logic device for converting the volume signal into a mass signal accounting for the temperature of the liquid. A mass readout is desirable for some liquids such as fuels used in turbine engines. For example, Jet A, JP4, JP-5, and JP-8 are normally measured in pounds mass instead of gallons in an aircraft.

In another embodiment, a method is disclosed for determining the quantity of fuel in a tank, without introducing electrical energy into the tank, by translating the position of a float from a first liquid level within the tank, sensing the rotational displacement of a first rotor magnetically coupled to a second rotor to rotate together about a common axis as the liquid level changes within the tank. The method comprises steps of adding a measured first quantity of liquid for a first liquid level to a tank for a first float position. Next, the signal produced by the first float position is detected and a measured second quantity of liquid to the tank for a second float position corresponding to a second liquid level is added. Finally, the signal produced by the second float position is detected.

A technical advantage of the present invention is the provision of a liquid level fuel transmitter that does not introduce electrical energy into the tank.

Another technical advantage of the present invention is the reduced complexity and cost of the fuel transmitter of the present invention as compared to prior art devices.

BRIEF DISCUSSION OF THE DRAWINGS

The advantages of the invention including specific embodiments will be understood by those of ordinary skill by reference to the following detailed description taken in conjunction with the independent drawings in which.

Figure 6A:
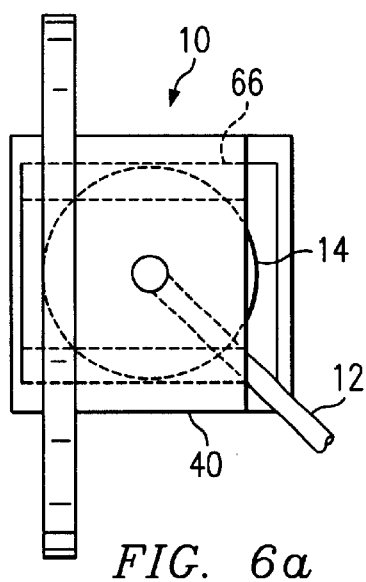
Figure 6B:
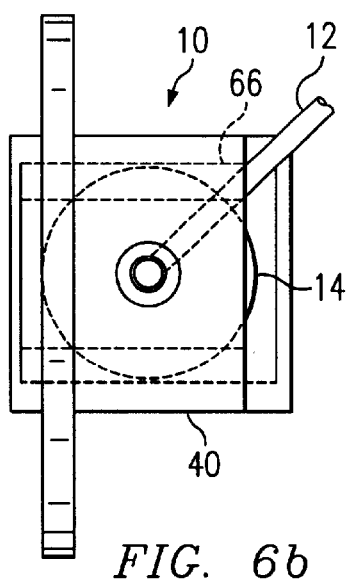
Figure 7A:
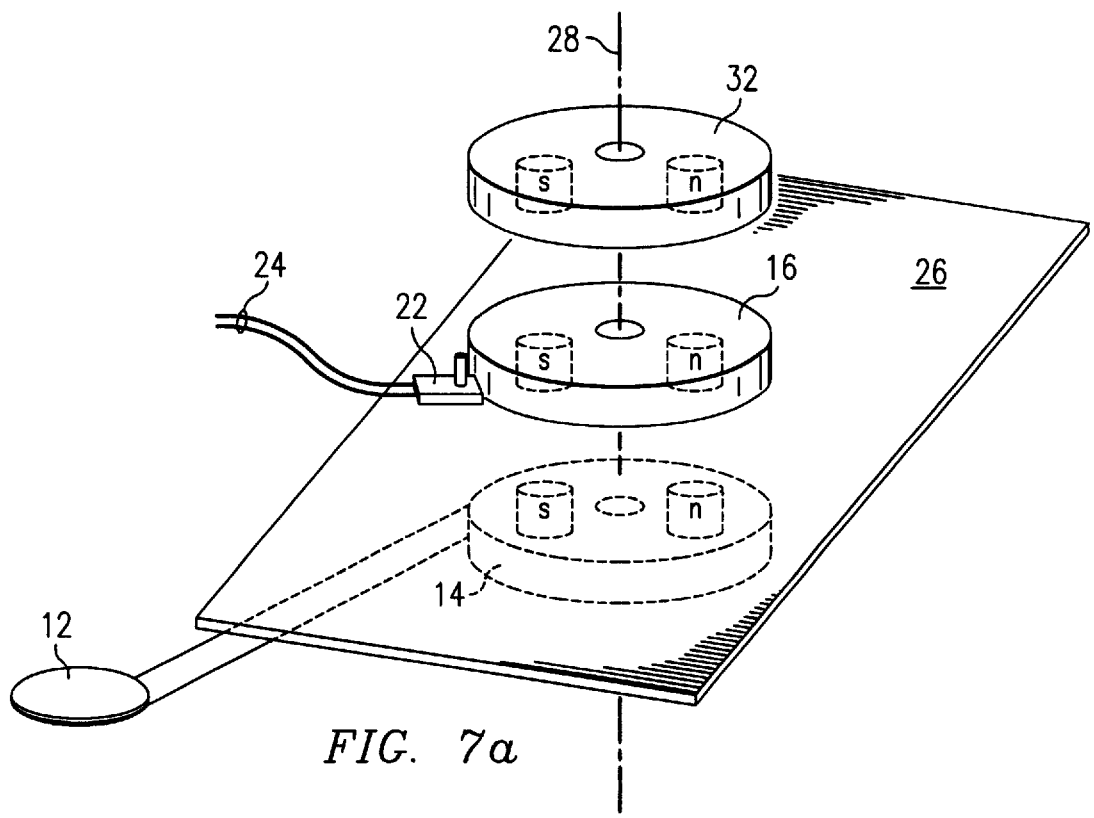
Figure 7B:
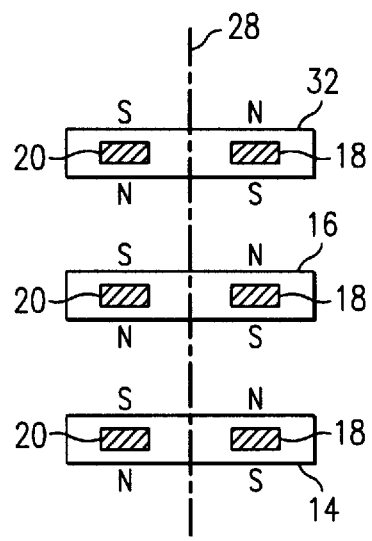
Figure 8:
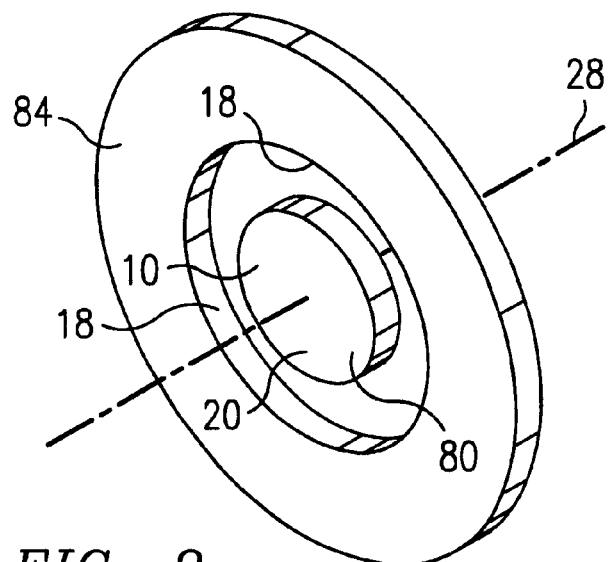
Figure 9:
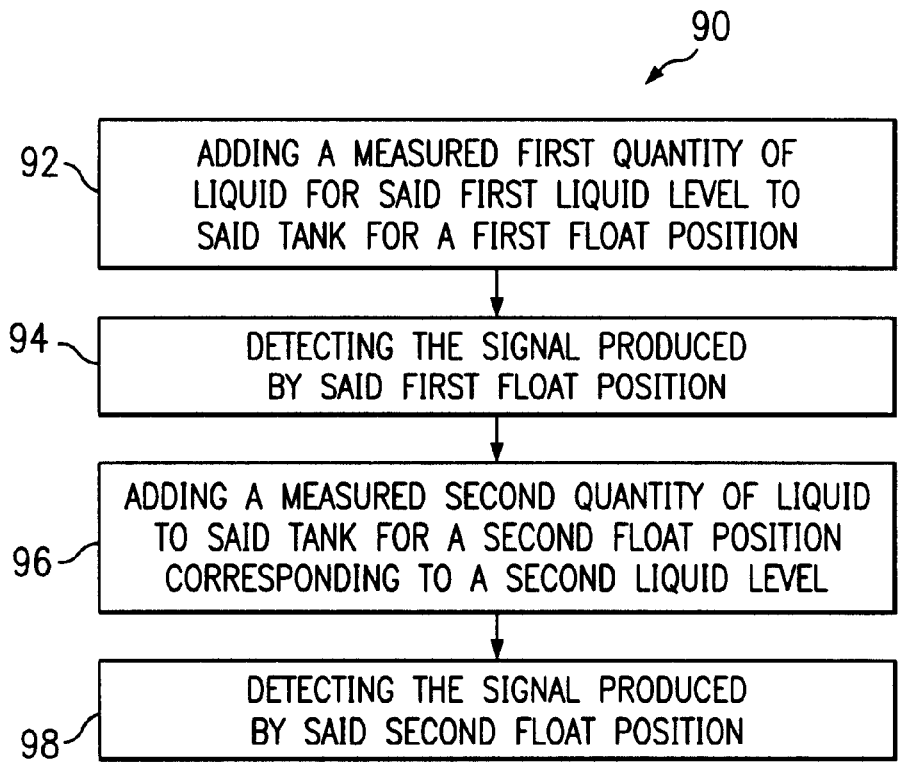

FIGS. 4A–D, 5A–D depict a dual rotor liquid level transmitter according to a preferred embodiment of the invention;

FIGS. 6A and 6B depict a dual rotor liquid level transmitter according to one embodiment of the invention;

FIGS. 7A and 7B depict a triple rotor liquid level transmitter according to one embodiment of the invention;

FIG. 8 depicts a concentric rotor arrangement according to one embodiment of the invention; and FIG. 9 is a flow diagram of a method according to one embodiment of the invention.

References and terms in the detailed description correspond to like references and terms in the figures where obvious and unless otherwise indicated.

DETAILED DESCRIPTION OF THE PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1A:
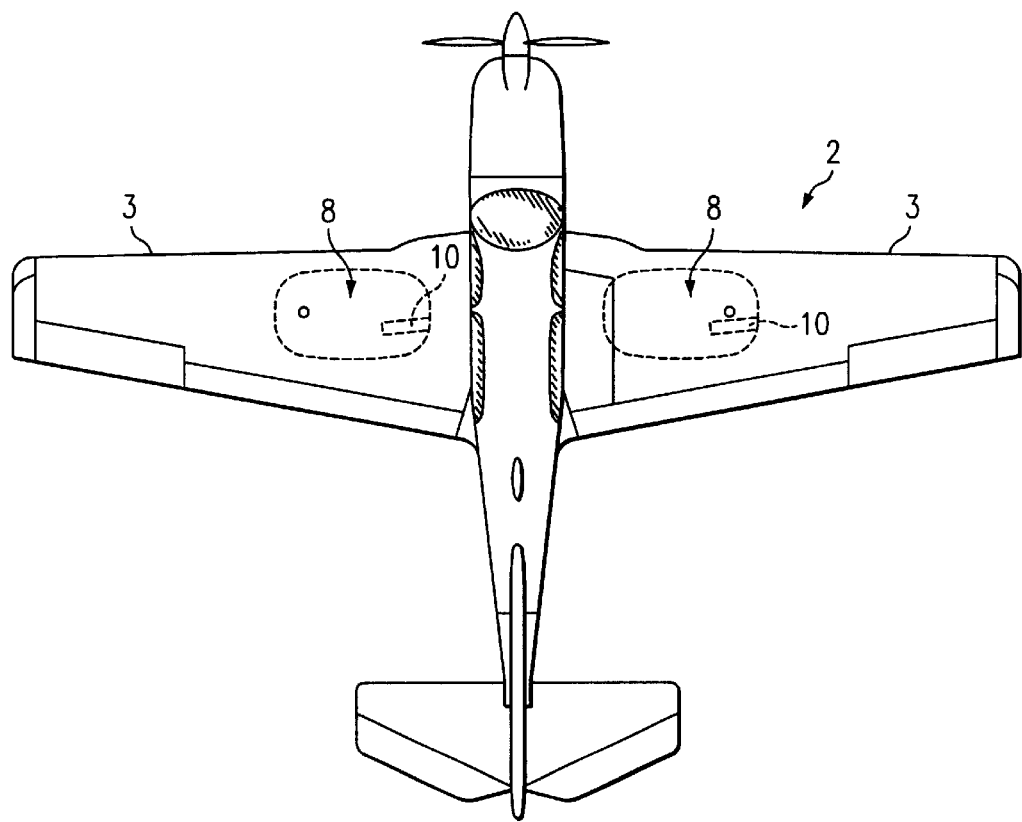
FIGS. 1A and 1B illustrate a system installation according to one embodiment of the invention.
Figure 1B:
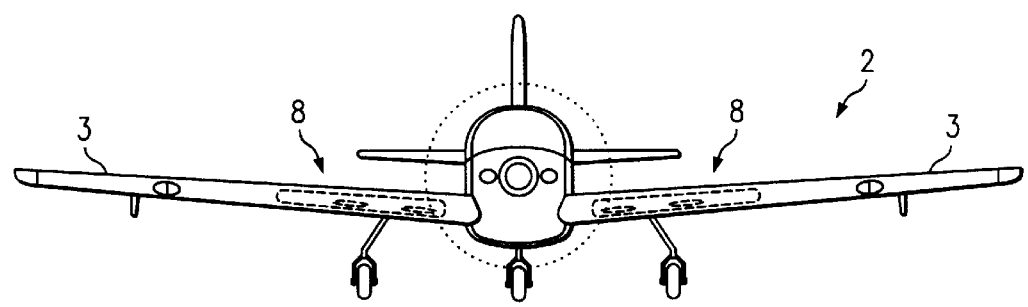

To fully appreciate the invention, reference is made to FIGS. 1A and 1B, wherein a tank 8 is shown in a typical location in the wing 3 of an airplane 2. Each wing 3 contains a tank 8. In this case, tank 8 stores the fuel used to power the airplane 2. Accordingly, an accurate indication of the amount of fuel in tank 8 is vital to the pilot. For example, if the airplane 2 is using fuel at a rate greater than the rate the pilot planned, the airplane 2 will run out of fuel before reaching the destination. An accurate fuel indicator would allow the pilot to recognize the problem and land for fuel instead of crashing. Additionally, since the fuel vapor is extremely explosive, it is desirable to keep electrical circuits from entering tank 8. Liquid level transmitter 10 will facilitate allowing the pilot to have an accurate indication of the liquid level in the fuel tank without an electrical circuit entering the tank 8.

Figure 2:
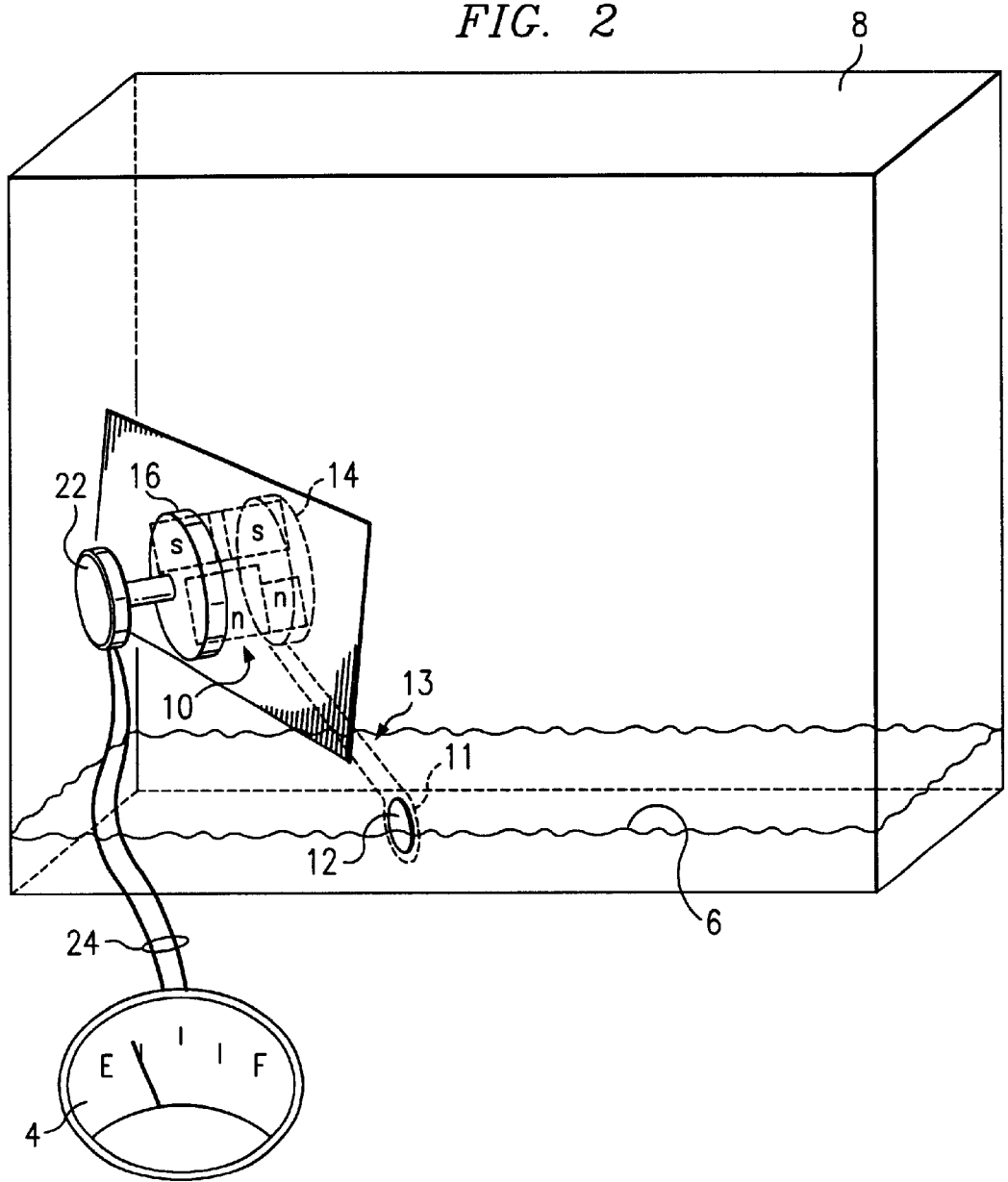
FIG. 2 depicts a liquid level measuring system according to one embodiment of the invention.

A system for indicating liquid level is depicted in FIG. 2. Tank 8 contains a quantity of liquid 6. Float assembly 12 includes a float arm 13 and a float which, as shown, rests on the liquid 6 and is connected to a liquid level transmitter 10 via the float arm 13. The liquid level transmitter 10 has a first rotor 14 located inside tank 8. The first rotor 14 is magnetically coupled to a second rotor 16 located outside of tank 8. In this configuration, the magnetic coupling between the first rotor 14 and the second rotor 16 causes the second rotor 16 to move in response to movement of the first rotor 14. As such, a change in the position of the float assembly 12 causes the rotors in the liquid level transmitter 10 to move. The movement results in a change in the volume signal produced by a measuring device such as potentiometer 22. The signal is transmitted through wires 24 to a gauge 4. Gauge 4 may be a digital or analog readout. In addition, gauge 4 may incorporate information about other properties such as temperature to provide other desired information. For example, in systems that yield a volume output, an output indicating mass may be calculated. There are curves that relate temperature and mass of typical aviation fuels, including but not limited to, Aviation Gasoline, Turbine Fuels Type JP-4, JP-5, JP-7, JP-8, Jet A, and Jet A-1. Thus by measuring the temperature of the fuel as well as the volume of the fuel, a calculation of the mass of the fuel may be made and displayed to the aircrew. The mass calculation may be performed by a logic device in the liquid level transmitter 10. Alternatively, the logic device may be located in other systems designed to provide flight data to the aircrew.

The liquid level transmitter 10 is capable of being installed in many different arrangements. For example, the liquid level transmitter 10 can be installed in a side wall, a top wall or a bottom wall of the tank 8. In the side wall configuration, which is the most common installation in an aircraft, there are two typical ways to position the rotor pair, vertical or horizontal, the choice of which is a cost trade-off. The geometry of a specific tank may accommodate one position of the rotors more conveniently than the other. For example, in a tall tank, a vertical rotor installation would be simpler than a horizontal rotor, since the float assembly 12 will need to transverse a vertical distance.

Figure 3A:
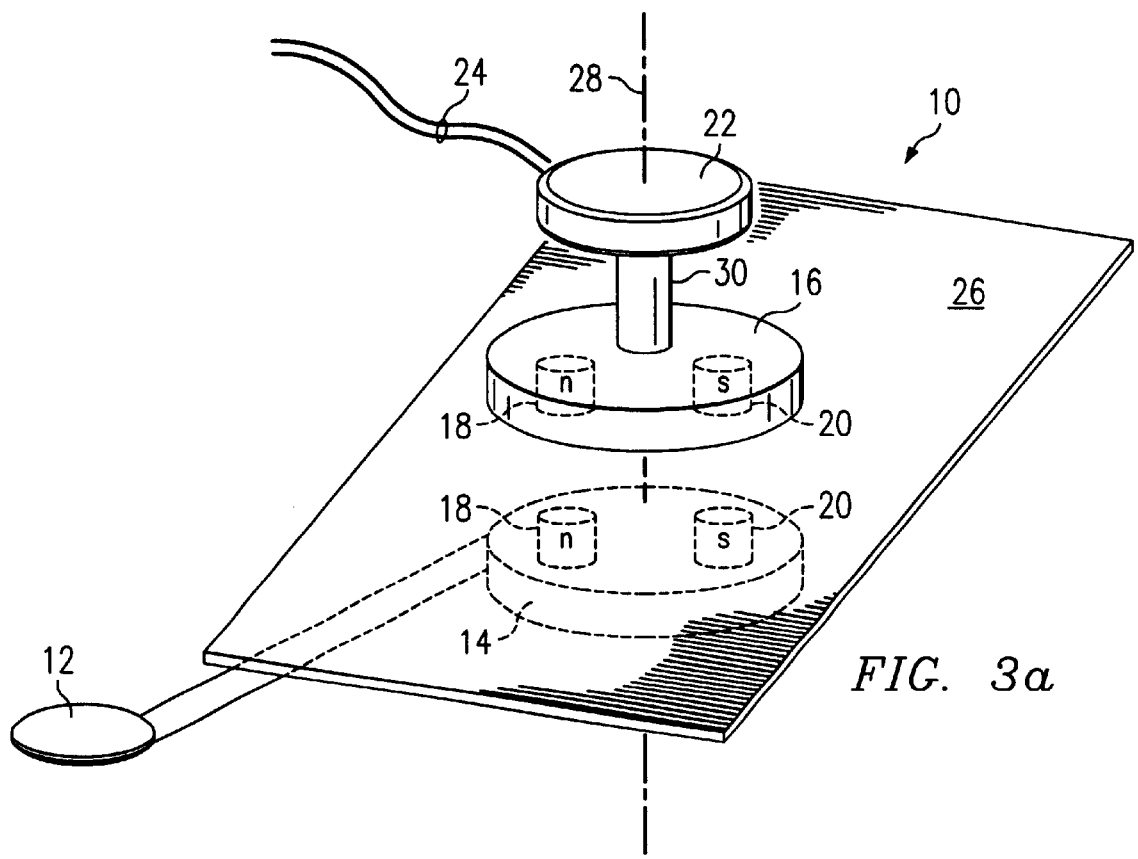
FIGS. 3A and 3B depict a dual rotor liquid level transmitter according to one embodiment of the invention.

In FIG. 3A, a liquid level transmitter 10 is shown. The float assembly 12 is directly connected to the first rotor 14. When the float assembly 12 moves in response to a change in liquid level 6 in tank 8, it moves the first rotor 14, also known as a drive rotor. The first rotor 14 may optionally be supported by a first axle (not shown). The movement of the first rotor 14 is followed by the second rotor 16, also called an output rotor, due to a magnetic coupling between the rotors 14, 16. The rotors 14, 16 rotate about a common axis 28 and are separated by a nonferrous wall 26. The movement of second rotor 16 produces a change in a liquid level indicator signal. The signal is typically produced by a single turn potentiometer 22. The potentiometer 22 also functions as a second axle 30 for the second rotor 16 to rotate about. The potentiometer 22 produces a signal through wires 24 which may be used to show a quantity indication on a gauge 4 in the cockpit, used by a flight control computer, or other uses known to those skilled in the art.

The float assembly 12 is directly connected to the first rotor 14 in FIG. 3A. Alternatively, the float assembly 12 may include a gearbox to translate the liquid level to the first rotor 14. A gearbox will allow the motion of the float assembly to match the desired range of movement of the float assembly 12 within tank 8 and the amount of movement needed by the second rotor 16 to drive the potentiometer 22 or other signal producing device. In addition the gears will ideally be anti-backlash gears to improve measurement accuracy.

Figure 3B:
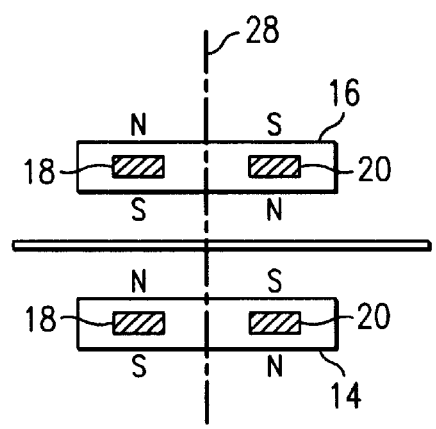

Each rotor is a disk with at least one magnet. The magnets on each rotor are aligned to engage with the magnets on the other rotor. In FIG. 3A, the first and second rotors 14, 16 are shown with two magnets each. A magnet has two poles commonly referred to as North (N) and South (S). The N pole is on one side of a magnet and the S pole is on the opposite side of the magnet. If two magnets are placed near each other, common poles repel each other and opposite poles attract to each other. For example, if two magnets are placed with the N side facing each other, the magnets will exert a force against each other. Accordingly, if the magnets are arranged with a N and a S pole facing each other, the magnets will be attracted to each other. A magnet installed with the N pole in an upward direction is denoted as 18 and a magnet installed with the S pole in an upward direction is denoted as 20. FIG. 3B illustrates the magnet orientation for a liquid level transmitter 10 with two rotors, each having two magnets. The first rotor 14 and the second rotor 16 each have one N pole magnet 18 and one S pole magnet 20. In this embodiment there is only one stable configuration for the rotors 14, 16, since when the rotors 14, 16 get out of alignment, as the like poles approach each other, a repelling force is applied and the rotors 14, 16 move back into an aligned position.

Figure 4A:
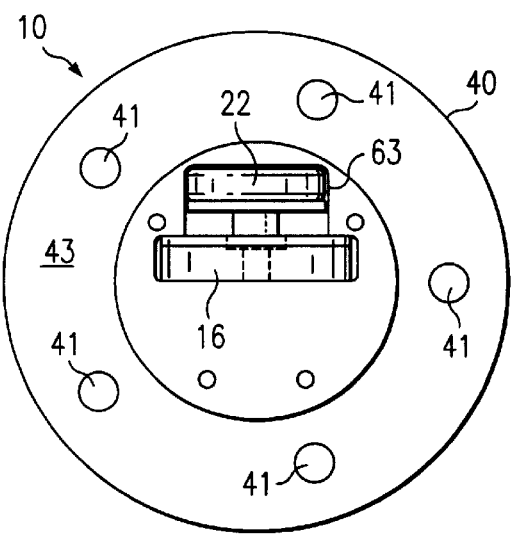
Figure 4B:
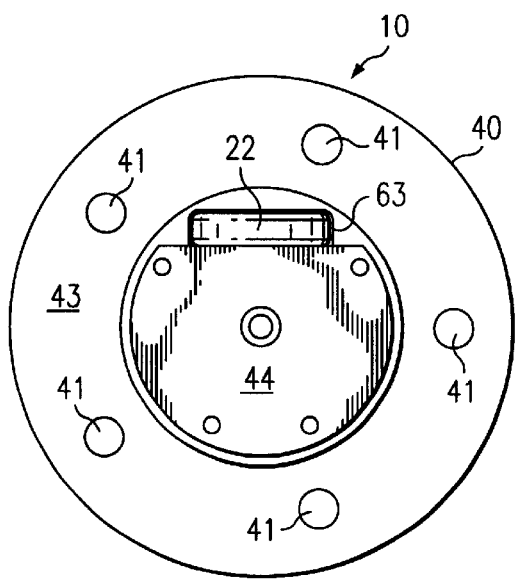

In FIGS. 4A through 4D, a preferred embodiment of the invention is shown. In FIG. 4A (front view) the liquid level transmitter 10 has a body 40 to hold the rotors and mount to the tank 8. Flange 43 is adapted to bolt to a hole in the side of tank 8. The body 10 is held in place with bolts, rivets or other suitable fasteners in holes 41. The second rotor 16 and the potentiometer 22 are in a cavity open to the front side of the body 40. FIG. 4B illustrates a cover 44 in place over the second rotor 16. The cover 44 protects the second rotor 16 from dirt and other interference. The cover 44 is held in place by bolts so the cover 44 is removable for maintenance.

Figure 4C:
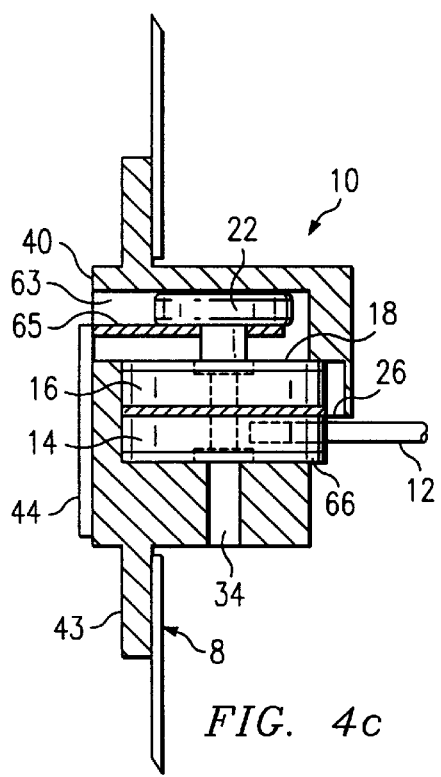
Figure 4D:
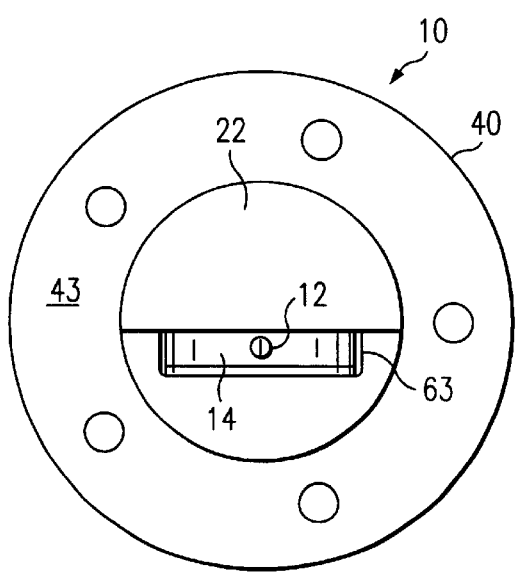

In FIG. 4C, a side view of liquid level transmitter 10 is shown. Potentiometer 22 and second rotor 16 are accessible from the front side, while first rotor 14 and float assembly 12 are accessible from the back side. The rotors 14, 16 are separated by a nonferrous wall 26. In FIG. 4D, a back view of the liquid level transmitter 10 is shown. First rotor 14 and the float assembly 12 are the only parts exposed on the back side since the back side will be in contact with the liquid 6, such as fuel in airplane 2. For example, the body 40 may be machined from a single piece of aluminum, die cast aluminum or zinc, or a molded plastic part.

Figure 5A:
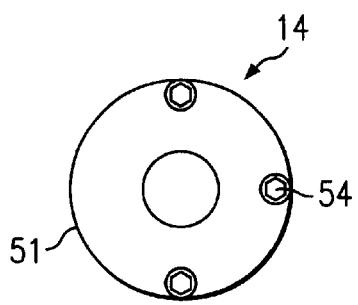
Figure 5B:
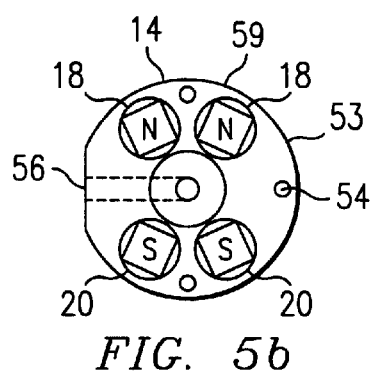

FIGS. 5A and 5B illustrate a first rotor 14. In FIG. 5A the top 51 of the first rotor 14 is shown. Top 51 has mounting holes 54 and serves as a cover to hold magnets in place in the bottom. FIG. 5B shows the bottom 53 of the first rotor 14. The bottom 53 has a float assembly attachment 56 which is a threaded hole in this embodiment. The bottom 53 also has four magnet cavities 59. A magnet is placed in each magnet cavity 59 to produce the desired magnetic coupling.

Figure 5C:
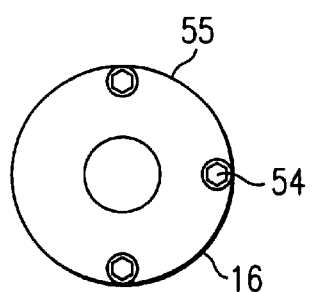
Figure 5D:
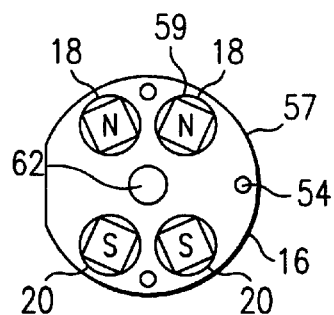

FIGS. 5C and 5D illustrate the configuration of the second rotor 16 according to one of the embodiments. The second rotor 16 is similar in construction to the first rotor 14 although instead of having a float assembly attachment 56, the second rotor 16 has a output attachment 60. In this case the output attachment 60 will allow the shaft of the potentiometer 22 to function as a second axle 30. Additionally, the rotors 14, 16 are machined from aluminum with the steel top pieces held in place with screws; however, a rotor may be molded from a suitable plastic with the magnets and top pieces molded in place. Additionally, a plastic part would be suitable for usage in potable water and corrosive chemicals tanks.

For example, a prototype system illustrated in FIGS. 4A–D and 5A–D has been built for initial laboratory and flight testing. The prototype is intended to be produced in small quantities and is not indicative of the ultimate methodology of manufacture. The body 40 is a cylindrical shape with a mounting flange 43 around the periphery. The cylindrical shape has a first cavity 66 machined into the tank side, said first cavity 66 accommodating a first rotor 14. This first rotor 14 is mounted in place by a threaded first axle 34 screwed into and locked to the body 40. The rotor shaft hole is similarly threaded. The first rotor 14 is inserted into the first cavity 66 and the threaded first axle 34 is screwed into both parts. The initial position of first rotor 14 is roughly centered in the first cavity 66 and the first axle 34 is locked to preclude rotation of the axle 34 in the body 40. FIGS. 6A and 6B illustrate the range of movement the first rotor 14 is able to follow the float assembly 12. FIG. 6A corresponds to a low fuel liquid level, for example an empty fuel tank. In FIG. 6B is shown a float assembly position corresponding to a high liquid level, such as a full fuel tank. Typically, the float assembly 12 consists of a float arm, a $\frac{1}{8}$" diameter aluminum rod. The float arm is threaded with 5–40 UNF thread and is screwed into the first rotor 14 and locked with a jam nut tightened against the flatted surface of the first rotor 14. The length and shape of the float arm is determined by the geometry of the tank. The float is typically, a molded plastic float and is attached to the float arm by means of crimps on the float arm, lightweight clamps, or other suitable means.

The non-tank side of the body 40 has second cavity 63 to accommodate a second rotor 16, identical to the first rotor 14 with the exception of the center shaft hole, a single turn potentiometer 22 and a mounting bracket 65. The mounting bracket 65 is designed such that when the assembly is installed, the axes 28 of both rotors 15, 16 are aligned. The potentiometer 22 with its wires 24 soldered in place, is attached to the mounting bracket 65 with its mounting nut, and the rotor is placed on the potentiometer shaft, roughly aligned for rotational location, with the rotor set screw holding the rotor lightly in place. The assembly is inserted into the second cavity 63 and secured with four screws. The float arm is moved to the "Empty" position and the value of the potentiometer is verified to be "Zero" at which time the rotor set screw is tightened and locked. The mounting flange 43 has a series of five holes located to match the standard mounting flange holes typical in aircraft fuel tanks.

Each rotor 14, 16 is a machined cylinder of aluminum with four magnet cavities 59 to accept four magnets. Three bolt holes 54 are provided to hold the top 53 or 55, respectively, in place. The magnets are loaded such that the North pole 18 is inserted into the two closest adjacent holes and the South pole 20 is inserted into the remaining two closest adjacent holes. The top pieces 53, 55 are then placed in position and secured with three machine screws. Depending upon the torque required and the strength of the magnets, it may be possible to use only two magnets. In this case two opposite cavities would be left empty. Although there are other magnet configurations that may be used, this configuration has only one stable state per turn, thus precluding an out of step rotational error in the side wall configuration. For example, with this machined configuration, placing the magnets in a alternating pole position, N, S, N, S, around the periphery would result in more than one stable state per one revolution.

In the case of the two rotors 14, 16 being mounted in parallel planes on a common axis 28 to produce the torsional moment to magnetically couple the first rotor 14 to the second rotor 16, there also exists an axial force. This force may be undesirable depending upon the form of transmitter employed. For example, in the case of a single turn potentiometer 22, the frictional drag of the potentiometer is the sum of both the rotational friction and the axial friction. In general, friction is the product of the coefficient of friction multiplied by the force normal to the friction surface. Thus, the magnetic fields to produce a rotational torque needed to minimize error, also produce an error component due to the axial force. In a similar manner an additional force is produced in the first rotor 14. The errors introduced from friction produce errors in the ability of the first rotor 14 to follow the input torque produced by the float and errors in the ability of the second 16 rotor to turn the readout device, in this case the potentiometer 22. Embodiments are disclosed herein that may be employed to reduce the axial force to near zero.

For various reasons it may be desirable to retain the parallel directly driven rotors, but excessive axial force cannot be tolerated for whatever reason. In this case three rotors may be arranged in a balanced configuration wherein there are three rotors on a common axis. One rotor is mechanically isolated on one side of the tank 8, such as the inside, while the other two rotors are on the other side of the tank 8, such as the outside. The rotors, while on opposite sides of a nonferrous plate 26, are arranged on axles each located on a common axis 28. Thus, when the first rotor 14 inside the tank is rotated, the second rotor 16 follows the rotation due to the magnetic coupling between the two rotors. The third rotor 32 also follows the rotation of the other two rotors 14, 16. The third rotor 32 offers mixed benefits, the axial force on the second rotor 16 is reduced to near zero, but the torque drag on the first rotor 14 remains and may even be greater depending upon the exact configuration. In some embodiments, the signal producing means must be either gear driven (more friction losses and more expense) or optically determined. Optical methods are the most desirable for low mechanical losses of any of the configurations discussed.

A three rotor embodiment is illustrated in FIG. 7A. The first rotor 14 is attached to the float assembly 12 inside a tank 8 (not shown). The second rotor 16 is on the outside of the tank 8, separated by the nonferrous wall 26. A third rotor 32 is also along a axis 28 that is common to all three rotors 14, 16, 32. Because all three rotors 14, 16, 32 are magnetically coupled, the second and third rotors 16, 32 follow the motion of the first rotor 14. Since the second rotor 16 is affected by the magnets of the first and third 14, 32 rotors and has balanced axial forces resulting in almost no net resultant axial force. Potentiometer 22 is mounted to be turned by the edge of the second rotor 16. Alternatively, gears or an optical encoder could be used to produce a signal from the rotation of the second rotor 16. FIG. 7B illustrates the magnet orientation for a liquid level transmitter 10 with three rotors, each having two magnets. The first rotor 14, second rotor 16 and third rotor 32 each have one N pole magnet 18 and one S pole magnet 20. It this embodiment there is only one stable configuration for the rotors 14, 16, 32 since when the rotors 14, 16, 32 get out of alignment, as the like poles approach each other a repelling force is applied and the rotors 14, 16 32 move back into an aligned position.

FIG. 8 depicts another embodiment that reduces axial forces. In this embodiment, the two rotors take the form of two concentric cylinders. A first cylinder 80 is mounted inside the second cylinder 84, both cylinders 80, 84 are on a common axis 28. Each cylinder is a magnet, or magnets, with poles such that when the outer cylinder is rotated the inner cylinder is magnetically coupled to the outer cylinder. The N and S magnets 18 and 20, respectively, are aligned to create a stable condition. There are many possible configurations that will work. The important aspect is for the magnetic torque to be adequate to allow the cylinders 80, 84 to remain aligned and not to have multiple stable configurations so the cylinders do not become misaligned. With the attracting magnetic poles located in similar positions along the axis, the forces acting on the cylinders 80, 84 are very nearly totally directed in a radial direction with little or no axial force. Either cylinder 80 or 84 could be attached to the float assembly 12 or the potentiometer 22 depending on the individual installation. Consequently, the errors due to axial forces are eliminated. The cylinders 80,84 may be long, high aspect ratio, or short, low aspect ratio, depending upon the physical configuration.

In the side wall configuration, which is the most common installation of an aircraft float transmitter, neither the high or low aspect ratio concentric cylinder methods is very practical for directly driven rotors. The gear driven rotor is more practical. This requires that the body 40 of the transmitter 10, which provides the mounting for the rotor pair, as well as closing the access hole in the tank 8, to be a "hat-shaped" cross-section. This is easily provided by either a simple machined part, a drawn metal housing, or a molded part. There still must be a mount provided for the gears. The second rotor 16 is directly connected to the readout device, typically a potentiometer 22.

For various reasons it may be desirable to retain the parallel directly driven rotors and accept the axial force acting upon the bearings of the rotors, but excessive axial force is undesirable on the readout device. In this case the readout device may be mounted to the output rotor by a flexure that will couple torque but not axial force. The most common way would be by use of a cylindrical bellows or a thin flat device, such as a disc or strip of thin metal, connected at its center to the shaft of the readout device and connected at its outer edge in the case of a disc or its ends in the case of a strip, to the second rotor 16.

Alternatives to the potentiometer 22 may also be used. The prototype device uses a single turn potentiometer or a multi-turn potentiometer to encode the position of the float inside of the tank. It is anticipated that other embodiments of the liquid level transmitter 10 will use, depending upon the environment and the ultimate readout device, alternative methods to encode the data, such as rotary digital encoders, optical encoders, magnetic encoders, or other means for producing a liquid level indicator signal.

FIG. 9 is flow diagram of a method disclosed in one embodiment. The method 90 involves determining the quantity of fuel in a tank, without introducing electrical energy into the tank 8, by translating the position of a float assembly 12 from a first liquid level within the tank 8, sensing the rotational displacement of a first rotor 14 with respect to a second rotor 16. The first and second rotors are magnetically coupled to rotate together about a common axis 28 as the liquid level changes within tank 8. The first step 92 requires adding a measured first quantity of liquid for a first liquid level to the tank 8 for a first float position. The second step 94 detects the signal produced by said first float position so an initial signal value is known. The third step 96 calls for adding a measured second quantity of liquid to tank 8 for a second float position corresponding to a second liquid level. Finally, the fourth step 98 detects the signal produced by the second float position so that it may be compared to the initial signal value. Knowing the respective liquid quantities and signal values it is possible for those skilled in the art to calibrate the system using a fuel transmitter 10.

While this invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description.

What is claimed is:

1. A liquid level transmitter adapted to engage a float assembly within a tank and produce a signal for use by a liquid quantity readout device, comprising:

a first rotor operably coupled to said float assembly such that motion of the float assembly within the tank causes a rotating action of said first rotor;

a second rotor magnetically coupled to said first rotor about a common axis, said second rotor adapted to follow the rotating action of said first rotor; and means for producing a liquid level quantity indicator signal coupled to said second rotor, so that the rotating action of said second rotor is used to determine the amount of liquid in said tank.

2. The liquid level transmitter of claim 1 wherein said float assembly further comprises a gearbox to translate movement of the float assembly into a rotational displacement of said first rotor.

3. The liquid level transmitter of claim 1 wherein said first and second rotors are concentric cylinders.

4. The liquid level transmitter of claim 1 wherein said first rotor further comprises at least one magnet aligned to magnetically couple with said second rotor.

5. The liquid level transmitter of claim 1 wherein said second rotor further comprises at least one magnet aligned to magnetically couple with said first rotor.

6. The liquid level transmitter of claim 1 wherein said first rotor further comprises a first axle along said axis about which said first rotor rotates.

7. The liquid level transmitter of claim 1 wherein said signal producing means is a variable resister.

8. The liquid level transmitter of claim 1 wherein said signal producing means is a single turn potentiometer.

9. The liquid level transmitter of claim 1 wherein said signal producing means is a multiple turn potentiometer.

10. The liquid level transmitter of claim 1 wherein said signal producing means is a rotary digital encoder.

11. The liquid level transmitter of claim 1 wherein said signal producing means is a optical encoder.

12. The liquid level transmitter of claim 1 wherein said signal producing means is a magnetic encoder.

13. The liquid level transmitter of claim 1 further comprising a wall separating said first and second rotors.

14. The liquid level transmitter of claim 1 wherein said signal is produced without introducing electrical energy into said tank.

15. The liquid level transmitter of claim 1 wherein said second rotor further comprises a second axle along said axis about which said second rotor rotates.

16. The liquid level transmitter of claim 15 wherein said second axle further comprises a flexure device to balance an axial force resulting from the magnetic coupling between said first and second rotors.

17. The liquid level transmitter of claim 16 wherein said flexure device is a cylindrical bellows.

18. The liquid level transmitter of claim 16 wherein said flexure device is a thin piece of metal.

19. The liquid level transmitter of claim 15 further comprising a third rotor on said second axle, said third rotor magnetically coupled to said second rotor and balancing an axial force between said first and second rotors.

20. A method of determining the quantity of fuel in a tank, without introducing electrical energy into said tank, by translating the position of a float assembly from a first liquid level within the tank, sensing the rotational displacement of a first rotor with respect to a second rotor, said first and second rotors having a magnetic coupling to rotate together about a common axis as the liquid level changes within said tank, comprising the steps of:
- adding a measured first quantity of liquid for said first liquid level to said tank for a first float position;
- detecting the signal produced by said first float position;
- adding a measured second quantity of liquid to said tank for a second float position corresponding to a second liquid level; and
- detecting the signal produced by said second. float position.

21. A system for determining liquid levels within a tank comprising:
- a float;
- a liquid level transmitter having a dual rotor configuration and capable of producing a volume signal corresponding to the location of said float;
- a float arm connecting said float and said liquid level transmitter;
- a gauge providing a readout from the volume signal;
- a temperature probe for measuring the temperature of said fuel within said tank and providing a temperature signal to said gauge;
- a set of relational data for mass as a function of temperature and volume; and
- a logic device for inputting said volume signal and a temperature signal and outputting a mass signal by applying the said volume and temperature signals to said relational data.

* * * * *